United States Patent [19]
Yoshikawa et al.

[11] 3,935,374
[45] Jan. 27, 1976

[54] LAMINATED SHEATHED CABLE

[75] Inventors: Kanji Yoshikawa; Yoshiharu Tatsukami, both of Niihama; Hiroshi Shimba; Hiroaki Mukunashi, both of Yokohama, all of Japan

[73] Assignees: Sumitomo Electric Industries, Ltd.; Sumitomo Chemical Company, Ltd., both of Osaka, Japan

[22] Filed: Dec. 18, 1972

[21] Appl. No.: 315,965

[30] Foreign Application Priority Data
Dec. 18, 1971 Japan............................ 46-102819

[52] U.S. Cl............. 174/102 R; 428/458; 428/461; 428/462; 428/463; 260/80.72
[51] Int. Cl.²...................... H01B 7/22; B32B 7/00
[58] Field of Search.......... 161/218, 216, 247, 252; 174/107, 110 PM, 110 SR, 120 R; 156/53, 56; 260/80.72; 428/458, 461, 462, 463

[56] References Cited
UNITED STATES PATENTS

| | | | |
|---|---|---|---|
| 3,383,372 | 5/1968 | Spivey............................. | 161/218 X |
| 3,590,141 | 6/1971 | Mildner............................. | 174/107 |
| 3,640,968 | 2/1972 | Raymond......................... | 161/218 X |
| 3,687,748 | 8/1972 | Clock et al. ........................ | 174/107 |
| 3,703,605 | 11/1972 | Dembiak et al. .................. | 174/107 |
| 3,826,862 | 7/1974 | Ichiba et al......................... | 428/461 |

*Primary Examiner*—George F. Lesmes
*Assistant Examiner*—William R. Dixon, Jr.
*Attorney, Agent, or Firm*—Sughrue, Rothwell, Mion, Zinn & Macpeak

[57] ABSTRACT

The mechanical properties of laminate sheathed cables are improved by using as the shielding layer a laminate tape prepared by coating a metallic foil with an ethylene-glycidyl-methacrylate-vinyl acetate terpolymer

5 Claims, 2 Drawing Figures

LAMINATED SHEATHED CABLE

This application is a companion to copending application Ser. No. 359,944 filed May 14, 1973 and application Ser. No. 360,248 filed May 14, 1973, both of which are directed to a laminate sheathed cable and a laminate tape.

BACKGROUND OF THE INVENTION

1. Field of the Invention

The present invention relates to a laminate sheathed cable, more particularly, it relates to a laminate sheathed cable having a shielding tape or layer prepared by coating a metallic foil with a specific resin having a good adhesive property not only for the metallic foil but also polyethylene used as an outer jacketing or protective layer.

2. Description of the Prior Art

A resin used for lamination in laminate sheathed cables is required to have good processing and mechanical properties during production of the cable, for example, high abrasion resistance to tape forming apparatus, etc., and good adhesion for both metallic foil and a jacketing compound, such as polyethylene.

Aluminum is usually used for such a metallic foil, and the reason why the laminate resin is required to have good adhesion for the metallic foil and the polyethylene which is usually used as the jacketing layer is partially to improve the moisture resistance, that is, the laminate resin must serve to prevent moisture permeation as well as to improve the mechanical strength such as bending property, etc., in a unitized sheath (jacketing layer) by strongly laminating the metallic foil to the polyethylene jacketing layer and must also help to control the shrinkage of the sheath (a plastic sheath has stress therein at extrusion and thus shrinks due to the heat cycle upon exposure to the open air) by the metallic foil.

As the resin for the laminate, polyethylene has ordinarily been used, as shown in British Pat. No. 886,417, but polyethylene is lacking in bonding strength to the aluminum foil.

This defect of polyethylene is partially overcome by the invention described in U.S. Pat. No. 3,233,036 wherein a resin or polymer containing a carboxyl group is employed to improve the bonding strength to an aluminum foil, but the proposed resin has the defect that a sufficient bonding strength for polyethylene as the jacketing layer is not obtained.

An attempt to overcome the aforesaid two defects is also disclosed in U.S. Pat. No. 3,586,756, which teaches a so-called two-layer or multi-layer laminate tape, having at the side to be brought into contact with a metallic foil, such as aluminum foil, a layer of an ethylene copolymer having a carboxyl group capable of being chemically bonded to the matallic foil and, at the opposite side of the aforesaid ethylene copolymer, a layer of resin which does not have an effective bonding strength for the metallic foil as does the ethylene copolymer, but which has a higher bonding strength for the jacketing layer than the ethylene copolymer.

When a laminate tape of this kind is used the mechanical properties of the laminate sheathed cable are excellent, but since the laminate tape has a two-layer or multi-layer structure the production of the laminate tape is complicated and the production costs become high, which results in increasing the cost of the cable.

SUMMARY OF THE INVENTION

An object of this invention is to provide a laminate sheathed cable having excellent mechanial properties as a cable with high economic advantage by employing a resin composition which has a sufficient bonding strength for both the metallic foil and the polyethylene jacketing layer in such a laminate sheathed cable and which avoids complicated steps of producing a laminate tape as in the above-indicated prior art. The above object of this invention can be attained by employing an ethylene-glycidyl-methacrylate-vinyl acetate terpolymer as the laminate resin for the metallic foil.

BRIEF DESCRIPTION OF THE DRAWINGS

FIG. 2 is a series of schematic views showing a bonding strength test method for laminate tapes of this invention.

DETAILED DESCRIPTION OF THE INVENTION

The above-mentioned terpolymer used in this invention may be prepared by various means. For example, the copolymer may be prepared by copolymerizing ethylene and the other comonomers at temperatures of from 40° to 300°C and under a pressure of from 40 to 5,000 Kg/cm$^2$ in the presence of catalysts capable of forming free radicals. At the copolymerization of the terpolymer, a chain transfer agent such as ethane, propane, propylene, etc., can be added to the reaction system, if desired.

When the aforesaid resin is used for the lamination of a metallic foil, the resin shows an excellent bonding strength for both the metallic foil and the jacketing polyethylene layer, providing a laminate tape having excellent mechanical strengths as well as good processability during the production of the laminate sheathed cable.

Figure 1:
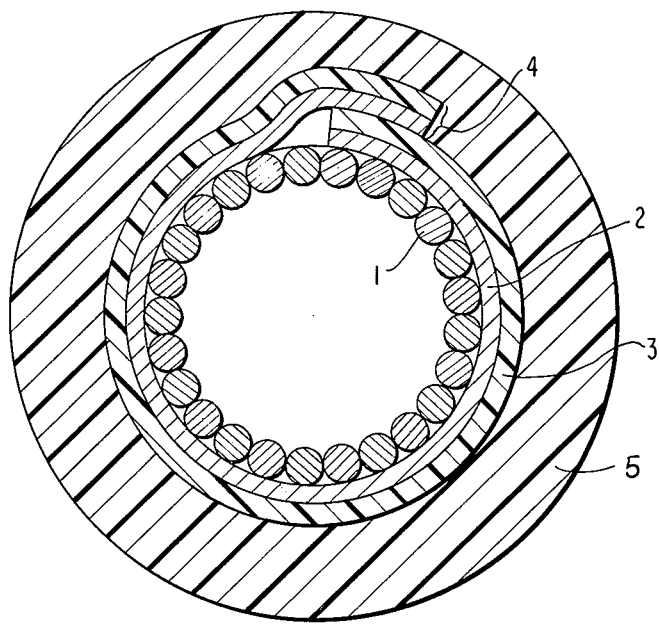
FIG. 1 is a cross sectional view showing a conventional laminate sheathed cable.
Figure 1:
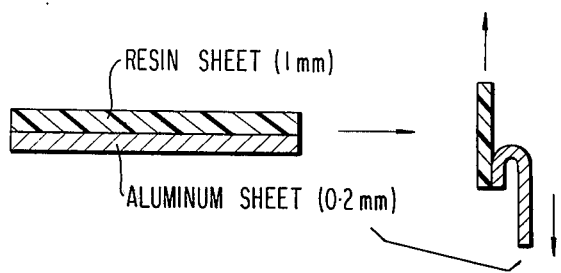
Figure 1:
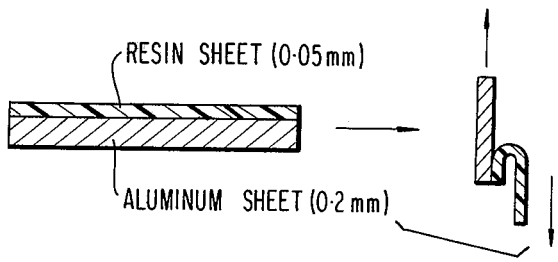
Figure 1:
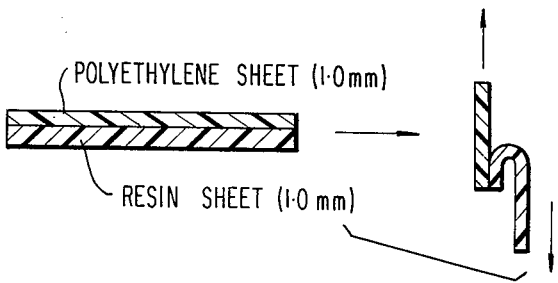

FIG. 1 of the accompanying drawings shows a cross sectional view of a conventional laminate sheathed cable. A laminate sheathed cable is generally composed of cable cores 1, a laminate foil layer 4 consisting of a metallic tape 2 having laminated thereon a resin layer 3 and a jacketing layer 5 composed of a synthetic resin.

The merits of the resin composition used in this invention will be illustrated in detail by referring to the following specific examples. In addition, since aluminum foil is ordinarily used as the metallic layer in laminate sheathed cables, an aluminum foil was used as the metallic layer in the following examples and comparison examples.

Table 1

| Resin | Melt Index ASTM-1238 | (Fundamental properties of Resin) Tensile Strength JIS K-6760 | Elongation JIS K-6760 | Abrasion Coefficient* |
|---|---|---|---|---|
| $E_1$ | 12.4 g/10 min. | 1.48 Kg/mm$^2$ | 550% | 0.50 |
| $E_2$ | 2.8 | 1.80 | 614 | 0.45 |
| $A_1$ | 5.7 | 1.62 | 768 | 0.70 |

Table 1-continued

| Resin | Melt Index ASTM-1238 | (Fundamental properties of Resin) Tensile Strength JIS K-6760 | Elongation JIS K-6760 | Abrasion Coefficient* |
|---|---|---|---|---|
| $A_2$ | 1.7 | 2.59 | 763 | 0.68 |
| S | 3.5 | 2.92 | 478 | 0.56 |
| P | 7.2 | 1.27 | 512 | 0.40 |
| $G_1$ | 2.0 | 1.72 | 615 | 0.46 |
| $G_2$ | 2.0 | 1.76 | 638 | 0.48 |
| $G_3$ | 2.0 | 1.67 | 622 | 0.48 |
| $G_4$ | 6.0 | 1.71 | 661 | 0.54 |
| $G_5$ | 2.0 | 1.75 | 650 | 0.45 |
| $G_6$ | 12.0 | 1.60 | 670 | 0.55 |

*abrasion coefficient to copper surface

The compositions of the terpolymers $G_1$ to $G_6$ (ethylene-glycidylmethacrylate-vinyl acetate copolymers) were as follows:

| Resin | GMA | VA | Ethylene |
|---|---|---|---|
| $G_1$ | 0.6 | 8 | balance |
| $G_2$ | 2.4 | 8 | balance |
| $G_3$ | 6.0 | 6 | balance |
| $G_4$ | 12.0 | 6 | balance |
| $G_5$ | 2.4 | 4 | balance |
| $G_6$ | 15.0 | 2 | balance |

GMA : glycidyl methacrylate.
VA : vinyl acetate
Units : weight percent
Other resin compositions:
$E_1$-$E_2$ : ethylene-vinyl acetate copolymers.
$A_1$-$A_2$ : ethylene-acrylate copolymers.
S : a copolymer of ethylene and a comonomer containing a carboxyl group.
P : polyethylene.

Table 2

| Resin | (Adhesive Property and Other Properties of the Resins) | | | | |
|---|---|---|---|---|---|
| | (A) Sheet (1)* (g/cm) | (A) Laminate Tape (2)* (g/cm) | (B) Sheet (3)* (Kg/cm) | (C) (4)* | (D) (5)* |
| $E_1$ | 341 | 341 | 4 | bad | observed |
| $E_2$ | 394 | 320 | 4 | good | not observed |
| $A_1$ | 1613 | 433 | 4 | bad | observed |
| $A_2$ | 1068 | 421 | 4 | bad | observed |
| S | 1559 | 1055 | 0 | good | not observed |
| P | 159 | 50 | 5.5 | good | not observed |
| $G_1$ | 2000 | 700 | 4 | good | not observed |
| $G_2$ | '' | '' | '' | good | not observed |
| $G_3$ | '' | '' | '' | good | not observed |
| $G_4$ | '' | '' | '' | good | not observed |
| $G_5$ | '' | '' | '' | good | not observed |
| $G_6$ | '' | '' | '' | good | not observed |
| 2-layer tape (6)* | — | 520 | — | good | not observed |

(A): Adhesive strength between aluminum foil and the laminate resin; (B): Adhesive strength between laminate resin and polyethylene; (C): Processability to cable; (D): Blocking or sticking of laminate tape. (—): Not tested.
(1)*: A sheet of the resin having a thickness of 1.0 mm was attached to a soft aluminum sheet having a thickness of 0.2 mm by pressing the resin sheet onto the aluminum sheet at 180°C and then cooling the assembly to room temperature. (The adhesive strength was measured by peeling the aluminum sheet and the resin sheet at an angle of 180° at a peeling rate of 100 mm/min.
(2)*: Resin of a thickness of 0.05 mm was laminated on a soft aluminum sheet having a thickness of 0.2 mm by means of an extruding machine. (The test method of the adhesive strength is described in (1) above.)
(3)*: A sheet of the resin having a thickness of 1.0 mm was attached to a jacketing polyethylene sheet (low density polyethylene) having a thickness of 1.0 mm by pressing the polyethylene sheet onto the resin sheet at 160°C and then cooling the assembly to room temperature. (The test method of the adhesive strength is described in (1) above.)
(4)*: The surface of the resin film was abraded or grazed by a laminate tape forming apparatus, etc., as occurs in the case of producing cable. The extent of the abrasion depended upon the mechanical properties of the resin or the kind and the content of the comonomer or comonomers in the resin.
(5)*: The rolled laminate tape caused blocking during preservation. The extent of the blocking depended upon the kind and the content of the comonomer or comonomers, and the melt index of the resin.
(6)*: The laminate tape prepared by the method described in U.S. Pat. No. 3,586,756.

As is clear from the results shown in Table 1 and Table 2, the ethylene-vinyl acetate copolymers (Resin $E_1$ and Resin $E_2$) were particularly weak in their adhesion to aluminum foil and the ethylene-acrylic acid ester copolymers (Resin $A_1$ and Resin $A_2$) were good in their adhesion to the aluminum foil but were poor in processability during cable manufacture and blocking resistance of the laminate tape.

Moreover, when polyethylene Resin P) was used as the laminate resin, the adhesion to the aluminum foil was weak and when the carboxyl group-containing resin (Resin S) was used as the laminate resin the adhesion to the jacketing layer was weak.

Accordingly, Resins $E_1$, $E_2$, $Aa_1$, $A_2$, P and S are unsatisfactory in one or more properties for use as the laminate material for cable.

From the above examples and comparison examples shown in the tables, it can be seen that the resin used in the present invention, that is the ethylene-glycidylmethacrylate-vinyl acetate terpolymer, was superior to conventional resins in all points, that is, in adhesive strength to aluminum foil and jacketing polyethylene layer and in processability to cable.

In addition, laminate sheathed cables were prepared by using the resins shown in Table 1 as the laminate resin, and the bending property of the cable and the adhesive strength of the resins to the aluminum foil and the jacketing polyethylene layer of each cable were measured, the results of which are shown in the following table.

Table 3

| Resin | (Properties of Cable) Adhesive Strength (Kg/cm$^2$) | Number of bending When Crack Appears in the Aluminum Foil |
|---|---|---|
| P | 0.95 | 10–15 times |
| S | 1.55 | 20–25 times |
| $E_1$ | 1.65 | 20–25 times |
| $G_1$ | 3.01 | 30–35 times |
| $G_2$ | 3.30 | 35–40 times |
| $G_3$ | 3.44 | 35–40 times |
| $G_4$ | 3.62 | 35–40 times |
| $G_5$ | 3.25 | 35–40 times |
| $G_6$ | 3.40 | 35–40 times |
| 2-layer tape | 3.05 | 30–35 times |

In the above table, the adhesive strength was measured as in Table 2 and the bending test was conducted by bending the cable at a bending angle of 180° over a mandrel having a diameter 12 times the diameter of the cable. One two directional bending motion was counted as one bending number.

As in shown in Table 3, the cables of this invention had almost the same properties as those of the cable prepared using the two-layer laminate tape. Thus, it will be understood from those results that the cable of this invention are excellent in mechanical properties as well as excellent from the economic view point.

The preferred terpolymers of the present invention comprises 0.5 to about 20 weight % GMA, 0.5 to about 20 weight % VA and balance ethylene (all weight % being based on total weight of GMA, VA and ethylene). Preferred terpolymers illustrate a melt index of 0.5 to about 20 (ASTM-1238).

Lesser and greater, especially greater, amounts of GMA and VA can be used, but generally optimum terpolymer properties are suitably achieved by terpolymers having a composition within the above range.

While the invention has been described in detail and with reference to specific embodiments thereof, it will be apparent to one skilled in the art that various changes and modifications can be made therein without departing from the spirt and scope thereof.

What is claimed is:

1. A laminate sheathed cable having as the shielding layer a laminate sheath tape composed of a metallic foil, an outer jacket, and a resin layer therebetween, the improvement wherein said resin for the laminate sheath tape is an ethylene-glycidyl methacrylate-vinyl acetate terpolymer, said terpolymer comprising 0.5 to about 20 weight % glycidyl methacrylate, 0.5 to about 20 weight % vinyl acetate, and about 60 to about 99 weight % ethylene, said weight percentages being based on the total weight of glycidyl methacrylate, vinyl acetate and ethylene.

2. The cable of claim 1 where said metallic foil is aluminum.

3. The cable of claim 1 where said outer jacket is polyethylene.

4. The cable of claim 1 where said terpolymer illustrates a melt index of 0.5 to about 20.

5. A laminate tape of a metallic foil and a terpolymer resin coated on one or both surfaces of said metallic foil, said resin consisting of an ethylene-glycidyl methacrylate-vinyl acetate terpolymer wherein said glycidyl methacrylate is used in amounts of 0.5 to about 20 weight %, said vinyl acetate in amounts of 0.5 to 20 weight %, and said ethylene in amounts of about 60 to about 99 weight %, said weight percentages being based on the total weight of glycidyl methacrylate, vinyl acetate and ethylene.

* * * * *